(12) United States Patent
Li et al.

(10) Patent No.: US 12,011,774 B2
(45) Date of Patent: Jun. 18, 2024

(54) POLE SAW

(71) Applicants: Intradin (Shanghai) Import & Export Co., Ltd, Shanghai (CN); BAC Industries Inc, Miltona, MN (US)

(72) Inventors: Jiayuan Li, Shanghai (CN); Jiaxi Ning, Shanghai (CN); Robert H Lusty, Miltona, MN (US); Nathan R Lusty, Miltona, MN (US)

(73) Assignees: Intradin (Shanghai) Import & Export Co., Ltd, Shanghai (CN); BAC Industries Inc, Miltona, MN (US)

( * ) Notice: Subject to any disclaimer, the term of this patent is extended or adjusted under 35 U.S.C. 154(b) by 122 days.

(21) Appl. No.: 17/566,788

(22) Filed: Dec. 31, 2021

(65) Prior Publication Data

US 2022/0176477 A1 Jun. 9, 2022

(30) Foreign Application Priority Data

Nov. 15, 2021 (CN) .......................... 202111347347.X

(51) Int. Cl.
  *B23D 49/10* (2006.01)
  *A01G 3/08* (2006.01)

(52) U.S. Cl.
  CPC ............. *B23D 49/10* (2013.01); *A01G 3/083* (2013.01)

(58) Field of Classification Search
  CPC ........ B23D 49/10; B23D 51/03; B23D 51/01; B23D 49/11; B23D 51/08; B23D 51/14; B23D 51/10; B23D 49/12; B23D 49/162; B23D 49/14; A01G 3/083; A01G 3/08; B27B 21/04; B26B 29/02; B26B 21/523; Y10T 16/4719; Y10T 16/473; Y10T 16/32467; Y10T 16/469; Y10T 16/476
  USPC ...... 30/517, 161, 166.3, 504, 151, 155, 340, 30/506, 507, 509, 514, 51, 8, 519, 25, 30/329–339, 296.1; 16/429, 427; 81/489
  See application file for complete search history.

(56) References Cited

U.S. PATENT DOCUMENTS

| | | | | |
|---|---|---|---|---|
| 4,535,539 | A * | 8/1985 | Friedman | B26B 1/046 30/159 |
| 4,716,653 | A * | 1/1988 | Skyba | B23D 51/03 30/296.1 |
| 5,511,310 | A * | 4/1996 | Sessions | B26B 1/042 30/155 |
| 6,694,620 | B2 * | 2/2004 | Kanzawa | B27G 19/006 30/504 |
| 7,325,314 | B1 * | 2/2008 | Chen | B23D 51/10 30/337 |
| 7,959,191 | B2 * | 6/2011 | Schouten | A47L 13/23 285/298 |
| 8,025,455 | B2 * | 9/2011 | Huang | F16B 7/1418 482/121 |

(Continued)

FOREIGN PATENT DOCUMENTS

| | | |
|---|---|---|
| CN | 208798384 U | 4/2019 |
| CN | 209897720 U | 1/2020 |

*Primary Examiner* — Ghassem Alie

(57) ABSTRACT

A pole saw, including a cutting assembly and a support assembly. The cutting assembly includes a serrated cutter and a sheath rotatably connected thereto. The sheath is provided with a groove for accommodating the serrated cutter. The serrated cutter can rotate with respect to the sheath to move into or out of the groove to be sheathed or exposed. The sheath is detachably arranged on the support assembly.

8 Claims, 7 Drawing Sheets

(56) References Cited

U.S. PATENT DOCUMENTS

| | | | | |
|---|---|---|---|---|
| 8,413,338 B2* | 4/2013 | Freeman | ................. | B26B 1/048 |
| | | | | 30/159 |
| 9,288,947 B1* | 3/2016 | Burnette | ................. | B27B 21/04 |
| 9,643,266 B1* | 5/2017 | Hooyman | ............... | B23D 51/01 |
| 10,772,261 B1* | 9/2020 | Hooyman | ............... | A01G 3/083 |
| 10,945,381 B1* | 3/2021 | Pringnitz | ................. | B25G 1/04 |
| 11,084,161 B2* | 8/2021 | Everingham | ............ | B25G 1/04 |
| 2009/0172950 A1* | 7/2009 | Jenkinson | ................ | A01G 3/00 |
| | | | | 30/155 |
| 2010/0192382 A1* | 8/2010 | Burch | ................. | B23D 61/123 |
| | | | | 83/697 |
| 2014/0090256 A1* | 4/2014 | Pringnitz | ............... | A01G 3/083 |
| | | | | 30/151 |

* cited by examiner

POLE SAW

CROSS-REFERENCE TO RELATED APPLICATIONS

This application claims the benefit of priority from Chinese Patent Application No. 202111347347.X, filed on Nov. 15, 2021. The content of the aforementioned applications, including any intervening amendments thereto, is incorporated herein by reference in its entirety.

TECHNICAL FIELD

This application relates to garden machinery, and more particularity to a pole saw.

BACKGROUND

A pole saw is designed for cutting high branches, and has been commonly used for pruning trees in the landscaping. With regard to the existing pole saw, a cutting assembly is fixed on a support assembly, rendering the existing pole saw large in length and inconvenient to carry.

SUMMARY

Accordingly, an object of the present disclosure is to provide a portable pole saw.

Technical solutions of the disclosure are described as follows.

This application provides a pole saw, comprising:
a cutting assembly; and
a support assembly;
wherein the cutting assembly comprises a serrated cutter and a sheath; the serrated cutter is rotatably connected to the sheath; the sheath is provided with a first groove for accommodating the serrated cutter; the serrated cutter is configured to rotate with respect to the sheath to move into or out of the first groove so as to make the serrated cutter sheathed or exposed; and the sheath is detachably arranged on the support assembly.

In some embodiments, the pole saw further comprises a first locking structure; the first locking structure is arranged on the support assembly; and the first locking structure is configured to lock the sheath with respect to the support assembly.

In some embodiments, the first locking structure comprises a bearing part and a first locking part; the bearing part is arranged on the support assembly; the bearing part is provided with a second groove; the sheath is provided with a clamping portion; the second groove is configured to accommodate the clamping portion; a side wall of the clamping portion is provided with a third groove; the first locking part passes through the bearing part, and partially extends into the second groove; and the first locking part is configured to move close to or away from the clamping portion with respect to the bearing part so as to be clamped by the third groove or separated from the third groove, such that the sheath is locked by the first locking part or released.

In some embodiments, the first locking structure further comprises an adjustment part and a first elastic part; the adjustment part is rotatably arranged on the bearing part; the adjustment part is configured to abut against an end of the first locking part extending out of the second groove to drive the adjustment part to rotate with respect to the bearing part, such that the first locking part is pushed to move close to the clamping portion with respect to the bearing part to be clamped with the third groove; the first elastic part is sleeved outside the first locking part, and abuts elastically against the end of the first locking part extending out of the second groove; and the first elastic part is configured to provide an elastic force to drive the first locking part to move away from the clamping portion with respect to the bearing part, such that the first locking part is separated from the third groove.

In some embodiments, the cutting assembly further comprises a second locking structure; the second locking structure is arranged on the sheath; and the second locking structure is configured to lock the serrated cutter with respect to the sheath.

In some embodiments, the second locking structure comprises a second locking part; the second locking part is rotatably arranged on the sheath; the second locking part is provided with a butting end; the serrated cutter is provided with a fourth groove; and the second locking part is configured to be driven to rotate with respect to the sheath to drive the butting end to move close to or away from the serrated cutter to enable the butting end to be clamped with or separated from the fourth groove, such that the serrated cutter is locked by the second locking part or released.

In some embodiments, the support assembly comprises a support rod and a telescopic assembly; the support rod is connected to the telescopic assembly; the sheath is detachably arranged on the telescopic assembly; and the telescopic assembly is configured to extend and retract along an axial direction of the telescopic assembly to enable a setting position of the sheath to be adjustable along the axial direction of the telescopic assembly.

In some embodiments, the telescopic assembly comprises a fastening part and a telescopic rod; the fastening part is arranged on the telescopic rod; one end of the telescopic rod is connected to the support rod, and the other end of the telescopic rod is detachably connected to the sheath; the telescopic rod is configured to extend and retract along an axial direction of the telescopic rod to enable the setting position of the sheath to be adjustable along the axial direction of the telescopic rod; and the fastening part is configured to lock the telescopic rod at a preset length.

In some embodiments, the telescopic rod comprises a plurality of rods; the plurality of rods are sleevedly connected successively; one of the plurality of rods closest to the support rod is connected to the support rod; one of the plurality of rods farthest from the support rod is detachably connected to the sheath; one of two adjacent rods is capable of moving along an axial direction thereof with respect to the other of the two adjacent rods to enable the telescopic rod to extend or retract along the axial direction of the telescopic rod; the fastening part is arranged at a connection between two adjacent rods, and is configured to enable locking between the two adjacent rods, such that the telescopic rod is locked at the preset length.

In some embodiments, the fastening part is sleevedly provided outside one of the plurality of rods; the fastening part is provided with a locking piece; a side wall of each of the plurality of rods is provided with a locking hole; the locking hole is provided with a head end and a tail end opposite to each other; a depth of the head end is greater than a length of the locking piece; a depth of the tail end is less than the length of the locking piece; one of two adjacent rods is capable of moving along an axial direction thereof with respect to the other of the two adjacent rods, such that locking holes of the two adjacent rods are aligned or staggered; the fastening part is capable of rotating with respect to one of the plurality of rods connected to the fastening part to enable the locking piece to move into or out of the locking hole through the head end, such that the locking piece is clamped by the locking hole or separated from the locking hole to enable locking or unlocking between two adjacent rods of the plurality of rods; and the tail end is configured to resist the locking piece to limit a rotation of the locking piece in a direction close to the tail end of the locking hole.

Compared to the prior art, the present disclosure has the following beneficial effects.

The serrated cutter is capable of rotating with respect to the sheath to move out of the first groove, such that the serrated cutter is exposed. The user holds the support assembly, and manually pushes and pulls the support assembly, such that the serrated cutter is driven by the sheath to prune trees. When the pole saw is not in use, the serrated cutter is capable of rotating with respect to the sheath to move into the first groove to be sheathed, preventing the serrated cutter from hurting the user. Additionally, the cutting assembly can be detached from the support assembly when the pole saw is not in use or needs to be transported, reducing the space occupation and improving the portability.

BRIEF DESCRIPTION OF THE DRAWINGS

Technical solutions of the present disclosure and the prior art will be described below with reference to the accompany drawings to facilitate the understanding. Obviously, presented in the accompany drawings are merely some embodiments of the present disclosure, and other accompany drawings can be obtained by those skilled in the art based on the drawings provided herein without paying creative effort.

Figure 1:
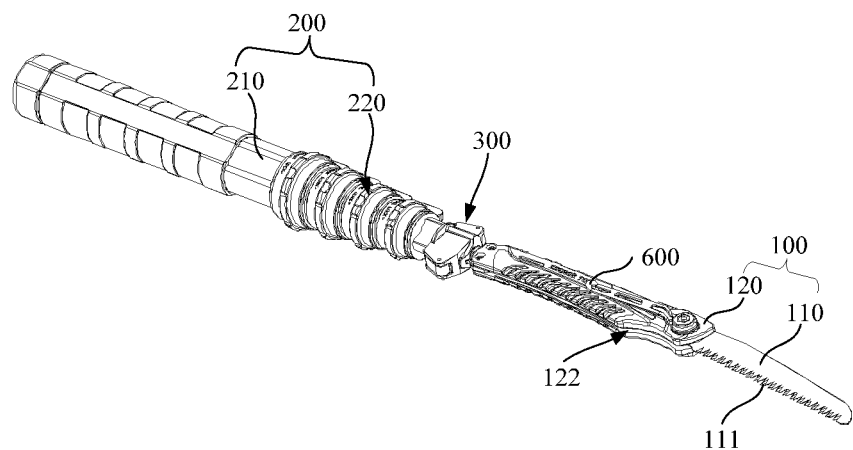
FIG. 1 schematically depicts a structure of a pole saw according to an embodiment of the present disclosure.

In the drawings, 100, cutting assembly; 110, serrated cutter; 111, serrated blade; 112, clamping groove; 1121, first clamping groove; 1122, second clamping groove; 120, sheath; 121, clamping portion; 1211, third accommodating groove; 122, first accommodating groove; 130, first baffle; 131, first protrusion; 132, first flanged edge; 133, second flanged edge; 140, second baffle; 141, second protrusion; 200, support assembly; 210, support rod; 211, hanging hole; 220, telescopic assembly; 221, fastening part; 2211, locking piece; 222, telescopic rod; 2221, rod; 22211, locking hole; 222111, first locking hole; 222112, second locking hole; 222113, third locking hole; 222114, head end; 222115, tail end; 22212, recess; 22213; third protrusion; 223, connecting sleeve assembly; 2231, first connecting sleeve; 2232, second connecting sleeve; 300, first locking structure; 310, bearing part; 311, second accommodating groove; 312, fourth accommodating groove; 320, adjustment component; 321, adjustment portion; 330, first locking part; 331, main body; 332, end; 340, first rotating shaft; 350, first elastic part; 400, second locking structure; 410, second rotating shaft; 420, second locking part; 421, pressing end; 422, butting end; 430, second elastic part; 440, clamping shaft; 500, anti-off part; 600, hanging part; and 700, hanging sleeve.

The objectives, technical solutions and beneficial effects of the present disclosure will be further described below with reference to accompanying drawings and embodiments.

DETAILED DESCRIPTION OF EMBODIMENTS

Technical solutions of the present disclosure will be clearly and completely described below with reference to the embodiments and accompanying drawings. Obviously, described below are merely some embodiments of this disclosure, and are not intended to limit the disclosure. Other embodiments obtained by those skilled in the art based on the embodiments provided herein without paying any creative effort should fall within the scope of the present disclosure.

It should be noted that as used herein, directional indications, such as up, down, left, right, front and back, are merely intended to explain a relative positional relationship and movement between components in a specific posture, and if the specific posture changes, the directional indication changes accordingly. In addition, terms, such as "first" and "second", are illustrative, and should not be understood as indicating or implying a relative importance or the number of elements. Elements defined with "first" and "second" may explicitly or implicitly include at least one of the element. Besides, the "and/or" used herein includes three solutions, for example, "A and/or B" includes A, B and a combination thereof. Additionally, technical solutions of various embodiments can be combined on the premise that the combined technical solution can be implemented by those skilled in the art. When the combination of technical solutions is contradictory or cannot be implemented, it should be considered that such a combination of technical solutions does not exist, nor does it fall within the scope of the present disclosure.

As shown in FIG. 1, a pole saw includes a cutting assembly 100 and a support assembly 200. The cutting assembly 100 includes a serrated cutter 110 and a sheath 120. The serrated cutter 110 is rotatably connected to the sheath 120. The sheath 120 is provided with a first accommodating groove 122 for accommodating the serrated cutter 110. The serrated cutter 110 is configured to rotate with respect to the sheath 120 to move into or move out of the first accommodating groove 122 so as to make the serrated cutter 110 sheathed or exposed. The sheath 120 is detachably arranged on the support assembly 200.

Specifically, the serrated cutter 110 is capable of rotating with respect to the sheath 120 to move out of the first accommodating groove 122, such that the serrated cutter 110 is exposed. The user holds the support assembly 200, and manually pushes and pulls the support assembly 200, such that the serrated cutter 110 is driven by the sheath 120 to prune trees. When the pole saw is not in use, the serrated cutter 110 is capable of rotating with respect to the sheath 120 to move into the first accommodating groove 122 to be sheathed, preventing the serrated cutter 110 from hurting the user. Additionally, the cutting assembly 100 can be detached from the support assembly 200 when the pole saw is not in use or needs to be transported, reducing the space occupation and improving the portability.

As shown in FIG. 1, the pole saw further includes a first locking structure 300. The first locking structure 300 is arranged on the support assembly 200. The first locking structure 300 is configured to lock the sheath 120 with respect to the support assembly 200. Specifically, when the sheath 120 is locked with respect to the support assembly 200 by the first locking structure 300, enhancing the stability and reliability of the pole saw. The cutting assembly 100 can be detached from the support assembly 200 when the sheath 120 is released with respect to the support assembly 200 by the first locking structure 300. Additionally, the cutting assembly 100 herein can be used independently.

As shown in FIGS. 2-5, the first locking structure 300 includes a bearing part 310 and a first locking part 330. The bearing part 310 is arranged on the support assembly 200. The bearing part 310 is provided with a second accommodating groove 311. The sheath 120 is provided with a clamping portion 121. The second accommodating groove 311 is configured to accommodate the clamping portion 121. A side wall of the clamping portion 121 is provided with a third accommodating groove 1211. The first locking part 330 passes through the bearing part 310, and partially extends into the second accommodating groove 311. The first locking part 330 is configured to move close to or away from the clamping portion 121 with respect to the bearing part 310 so as to be clamped by the third accommodating groove 1211 or separated from the third accommodating groove 1211, such that the sheath 120 is locked by the first locking part 330 or released. In this embodiment, the first locking part 330 is clamped by the third accommodating groove 1211, such that the sheath 120 is locked by the first locking part 330, preventing the sheath 120 from off the support assembly 200. When the sheath 120 needs to be detached, the first locking part 330 is separated from the third accommodating groove 1211, such that the sheath 120 is released by the first locking part 330, and the sheath 120 can be detached from the support assembly 200.

Figure 3:
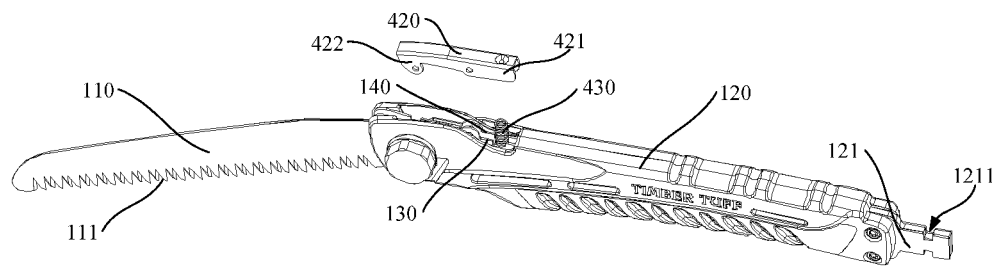
FIG. 3 schematically depicts a structure of a cutting assembly and a second locking structure according to an embodiment of the present disclosure.
Figure 4:
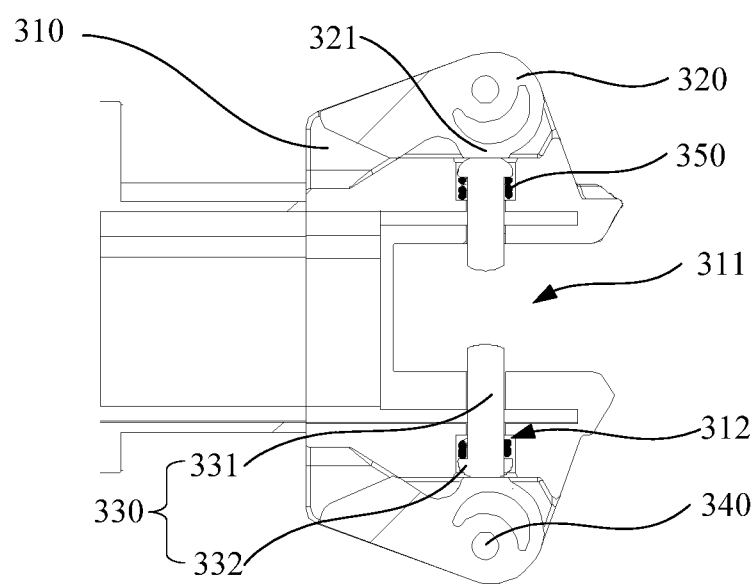
FIG. 4 schematically depicts a structure of the first locking structure according to an embodiment of the present disclosure.
Figure 5:
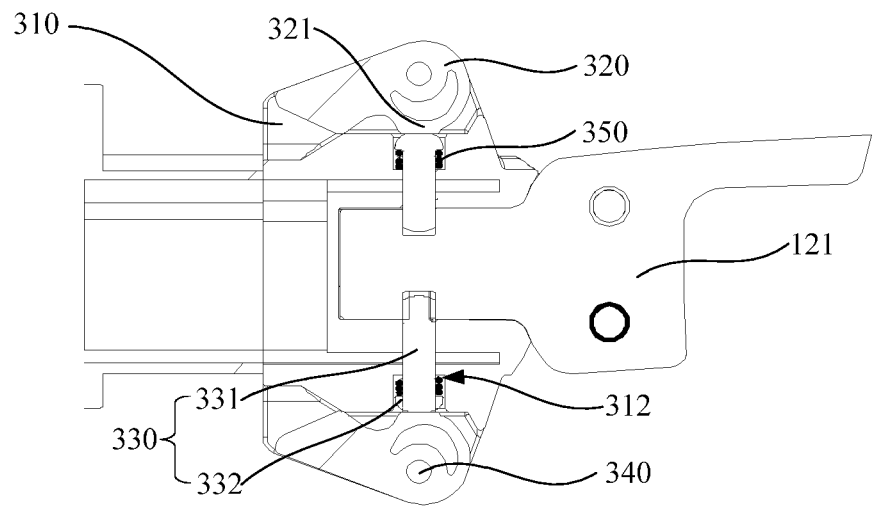
FIG. 5 is a sectional view of fitting between the cutting assembly and the first locking structure in coordination according to an embodiment of the present disclosure.

As shown in FIGS. 3-5, a plurality of third grooves 1211 and a plurality of first locking parts 330 are provided. The plurality of third grooves 1211 and the plurality of first locking parts 330 are one-to-one correspondence, enhancing a reliability of locking the clamping portion 121 by the plurality of first locking parts 330. In this embodiment, the number of the third grooves 1211 and the number of the first locking parts 330 both are two. The two third grooves 1211 and the two first locking parts 330 are one-to-one correspondence.

As shown in FIG. 5, the first locking structure 300 further includes an adjustment part 320 and a first elastic part 350. The adjustment part 320 is rotatably arranged on the bearing part 310. The adjustment part 320 is configured to abut against an end of the first locking part 330 extending out of the second accommodating groove 311 to drive the adjustment part 320 to rotate with respect to the bearing part 310, such that the first locking part 330 is pushed to move close to the clamping portion 121 with respect to the bearing part 310 to be clamped with the third accommodating groove 1211, and the sheath 120 is locked by the first locking part 330.

The first elastic part 350 is sleeved outside the first locking part 330, and abuts elastically against the end of the first locking part 330 extending out of the second accommodating groove 311. The first elastic part 350 is configured to provide an elastic force to drive the first locking part 330 to move away from the clamping portion 121 with respect to the bearing part 310, such that the first locking part 330 is separated from the third accommodating groove 1211. Specifically, when the adjustment component 320 is driven to rotate with respect to the bearing part 310 to push the first locking part 330 to move close to the clamping portion 121 with respect to the bearing part 310, the elastic part 350 is compressed by the first locking part 330. When the adjustment component 320 is driven to rotate reversely with respect to the bearing part 310, the adjustment component 320 is driven to move away from the first locking part 330 with respect to the bearing part 310, that is, the first locking part 330 is released by the adjustment component 320, such that the first elastic part 350 rebounds to drive the first locking part 330 to be separated from the third accommodating groove 1211, and the sheath 120 is released by the first locking part 330. In this embodiment, the elastic part 350 is a spring.

As shown in FIG. 5, an outside wall of the bearing part 310 is provided with a fourth accommodating groove 312. The first locking part includes a main body 331 and an end 332. The main body 331 passes through a footwall of the fourth accommodating groove 312 and extends into the second accommodating groove 311. The end 332 is arranged at an end of the main body 331 which exposes to the second accommodating groove 311. The first elastic part 350 is arranged in the fourth accommodating groove 312. The first elastic part 350 is sleeved on the main body 331. Two ends of the first elastic part 350 are pressed against to the footwall of the fourth accommodating groove 312 and the end 332, respectively. Specifically, when the adjustment component 320 is driven to rotate with respect to the bearing part 310 to push the first locking part 330 to move close to the clamping portion 121 with respect to the bearing part 310, a distance between the end 332 and the footwall of the fourth accommodating groove 312 gradually decreases, therefore the first elastic part 350 positioned between the end 332 and the footwall of the fourth accommodating groove 312 are gradually compressed.

As shown in FIG. 5, the first locking structure 300 further includes a first rotating shaft 340. The first rotating shaft 340 is arranged on the bearing part 310. The adjustment component 320 is rotatably arranged on the first rotating shaft 340. The adjustment component 320 is capable of rotating around an axis of the first rotating shaft 340 to drive the first locking part 330 to move close to the clamping portion 121 with respect to the bearing part 310, such that the first locking part 330 is clamped to the third accommodating groove 1211.

As shown in FIG. 5, the adjustment component 320 includes an adjustment portion 321. A distance between an outer of the adjustment portion 321 and the first rotating shaft 340 is gradually increased from one end of the adjustment portion 321 to the other end of the adjustment portion 321. The adjustment component 320 is capable of rotating around the first rotating shaft 340 to enable different part of the adjustment portion 321 to abut against the first locking part 330, such that a distance between the first locking part 330 and the first rotating shaft 340 gradually increases or decreases, therefore the first locking part 330 moves close to or away from the sheath 120. Specifically, when one end of the adjustment portion 321, of which the distance between an outer of the adjustment portion 321 and the first rotating shaft 340 is the smallest, abuts against the first locking part 330, the first locking part 330 is separated from the sheath 120. On the contrary, when the other end of the adjustment portion 321, of which the distance between an outer of the adjustment portion 321 and the first rotating shaft 340 is the biggest, abuts against the first locking part 330, the first locking part 330 is clamped with the sheath 120.

As shown in FIG. 1, the serrated cutter 110 is provided with a serrated blade 111. Specifically, the serrated blade 111 is configured to prune trees reliably.

In an embodiment, the serrated cutter 110 is detachably connected to the sheath 120. Specifically, the serrated cutter 110 is replaceable.

Figure 6:
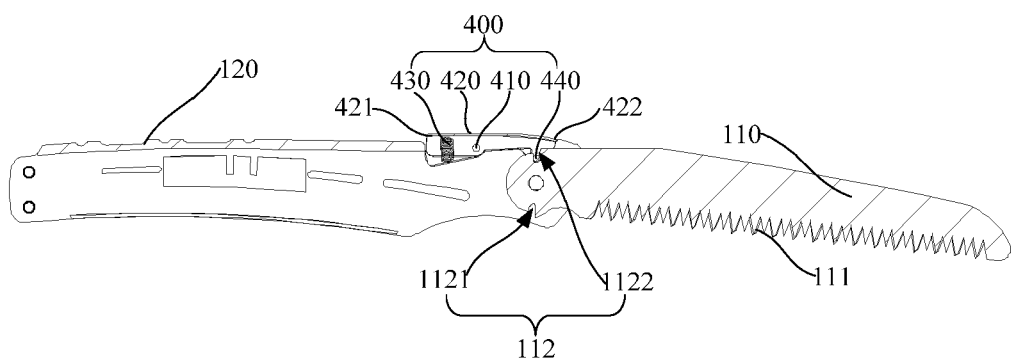
FIG. 6 is a sectional view of fitting between the cutting assembly and the second locking structure in coordination according to an embodiment of the present disclosure.

As shown in FIGS. 3 and 6, the cutting assembly 100 further includes a second locking structure 400. The second locking structure 400 is arranged on the sheath 120. The second locking structure 400 is configured to lock the serrated cutter 110 with respect to the sheath 120. Specifically, when the serrated cutter 110 is needed to be rotated with respect to the sheath 120, the serrated cutter 110 is released by the second locking structure 400. When the serrated cutter 110 rotates to a preset portion, the serrated cutter 110 is locked by the second locking structure 400 with respect to the sheath 120.

As shown in FIG. 6, the second locking structure 400 includes a second locking part 420. The second locking part 420 is rotatably arranged on the sheath 120. The second locking part 420 is provided with a butting end 422. The serrated cutter 110 is provided with a clamping groove 112. The second locking part 420 is configured to be driven to rotate with respect to the sheath 120 to drive the butting end 422 to move close to or away from the serrated cutter 110 to enable the butting end 422 to be clamped with or separated from to the clamping groove 112, such that the serrated cutter 110 is clocked by the second locking part 420 or released.

As shown in FIG. 6, the second locking structure 400 further includes a second rotating shaft 410. The second rotating shaft 410 is arranged on the sheath 120. The second locking part 420 is rotatably arranged on the second rotating shaft 410. The second locking part 420 is configured to rotate around an axis of the second rotating shaft 410 to drive the butting end 422 to move close to or away from the serrated cutter 110, such that the butting end 422 is clamped with or separated from the clamping groove 112. In this embodiment, the second rotating shaft 410 is penetratedly arranged in the sheath 120.

As shown in FIG. 6, the second locking part 420 is further provided with a pressing end 421. The pressing end 421 is arranged opposite to the butting end 422. The second locking structure 400 further includes a second elastic part 430. One end of the second elastic part 430 is connected to the sheath 120, and the other end of the second elastic part 430 is connected to the pressing end 421. The second locking structure 400 is configured to press against the pressing end 421 to drive the second locking part 420 to rotate around the axis of the second rotating shaft 410 to enable the butting end 422 to move close to the serrated cutter 110, such that the butting end 422 is clamped with the clamping groove 112, therefore the serrated cutter 110 is locked by the second locking part 420. The pressing end is configured to be pressed to drive the second locking part 420 to rotate around the axis of the second rotating shaft 410 to enable the butting end 422 moving away from the serrated cutter 110, such that the butting end 422 is separated from the clamping groove 112, therefore the serrated cutter 110 is released by the second locking part 420.

Specifically, the butting end 422 is clamped with the clamping groove 112 without an external force, and the serrated cutter 110 is locked and thus cannot rotate with respect to the sheath 120. When the pressing end 421 is pressed, the second locking part 420 is driven to rotate around the second rotating shaft 410 to enable the butting end 422 moving away from the serrated cutter 110, such that the butting end 422 is separated from the clamping groove 112, therefore the serrated cutter 110 is released. In addition, when the pressing end 421 is pressed, the second elastic part 430 is compressed. Therefore, when the pressing end 421 is released, the second elastic part is configured to rebound to press against the pressing end 421. As a consequence, the second locking part 420 is driven to rotate around the second rotating shaft 410 to enable the butting end 422 moving close to the serrated cutter 110, such that the butting end 422 is clamped with the clamping groove 112, therefore the serrated cutter 110 is locked again. In this embodiment, the second elastic part 430 is a spring.

As shown in FIG. 6, the second clamping part includes a first clamping groove 1121 and a second clamping groove 1122. The first clamping groove 1121 and the second clamping groove 1122 are positioned oppositely. The butting end 422 is capable of clamping with the first clamping groove 1121 or the second clamping groove 1122 to lock the serrated cutter 110 in a folding state or an opening state with respect to the sheath 120. Specifically, when the butting end 422 is clamped with the first clamping groove 1121 or the second clamping groove 1122, the serrated cutter 110 is capable of rotating with respect to the sheath 120 to enable the first clamping groove 1121 or the second clamping groove 1122 moving close to the butting end 422. When the first clamping groove 1121 is clamped with the butting end 422, the serrated cutter 110 is locked in the folding state. When the second clamping groove 1122 is clamped with the butting end 422, the serrated cutter 110 is locked in the opening state.

As shown in FIG. 6, the second locking structure 400 further includes a clamping shaft 440. The clamping shaft 440 is connected to the butting end 422. The butting end 422 is clamped with or separated from the clamping groove 112 through the clamping shaft 440, such that the serrated cutter 110 is locked or released. In this embodiment, the clamping shaft 440 is capable of clamping with the first clamping groove 1121 or the second clamping groove 1122 to lock the serrated cutter 110 in the folding state or the opening state with respect to the sheath 120.

Figure 12:
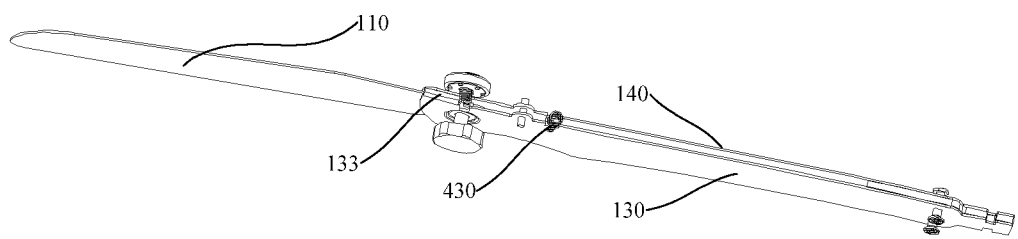
FIG. 12 schematically depicts a structure of a serrated cutter, a first baffle and a second baffle according to an embodiment of the present disclosure.

As shown in FIGS. 3 and 12, the cutting assembly 100 further includes a first baffle 130 and a second baffle 140. The first baffle 130 and the second baffle 140 are arranged in the first accommodating groove 122, oppositely. Two sides of the serrated cutter 110 are contacted with the first baffle 130 and the second baffle 140, respectively. Specifically, the first baffle 130 and the second baffle 140 are contacted with the two sides of the serrated cutter 110 to press against and clamp the serrated cutter 110, preventing the serrated cutter 110 from offsetting to the two sides.

Figure 13:
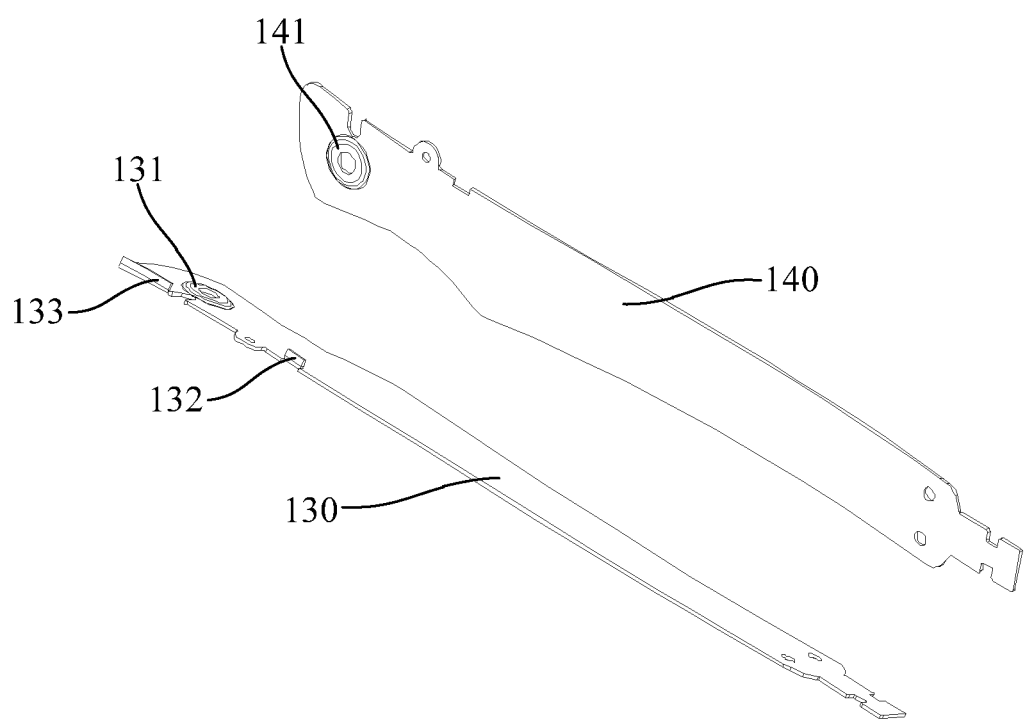
FIG. 13 schematically depicts a structure of the first baffle and the second baffle according to an embodiment of the present disclosure.

As shown in FIGS. 12 and 13, the first baffle 130 is provided with a first protrusion 131. The first protrusion 131 is arranged at a side of the first baffle 130 which faces the serrated cutter 110. The second baffle 140 is provided with a second protrusion 141. The second protrusion 141 is arranged at a side of the second baffle 140 which faces the serrated cutter 110. The two sides of the serrated cutter 110 are contacted with the first protrusion 131 and the second protrusion 141, respectively. Specifically, the first protrusion 131 and the second protrusion 141 are contacted with the two sides of the serrated cutter 110 to press against and clamp the serrated cutter 110, preventing the serrated cutter 110 from offsetting to the two sides. When the serrated cutter 110 rotates with respect to the sheath 120 to move into or out of the first accommodating groove 122, a sliding friction is generated between the serrated cutter 110 and the first protrusion 131 and the second protrusion 141 to enable the serrated cutter 110 to move into or out of the sheath 120 normally.

As shown in FIGS. 12 and 13, the first baffle 130 is further provided with a first flanged edge 132. The first flanged edge 132 is formed by extending the first baffle 130 towards a direction close to the serrated cutter 110. The first flanged edge 132 is connected to an end of the second elastic part 430 which is away from the pressing end 421. Specifically, the second elastic part 430 is in face contact with the first flanged edge 132 to prevent the second elastic part 430 from being caught in a gap between the first flanged edge 132 and the second baffle 140, enhancing a stability of the second elastic part 430.

As shown in FIGS. 12 and 13, the first baffle 130 is further provided with a second flanged edge 133. The second flanged edge 133 is formed by extending the first baffle 130 towards a direction close to the serrated cutter 110. The second flanged edge 133 is configured to press against a side of the serrated cutter 110 without the serrated blade 111 when the serrated cutter 110 is opened. Specifically, in one aspect, when the clamping shaft 440 is clamped with the second clamping groove 1122, the second flanged edge 133 presses against the side of the serrated cutter 110 without the serrated blade 111, such that the serrated cutter 110 is fixed by the second flanged edge 133 and the clamping shaft 440 simultaneously. In another aspect, when the serrated cutter 110 moves out of the first accommodating groove 122 by rotating with respect to the sheath 120 to enable the clamping shaft 440 to be separated from the first clamping groove 1121, if the clamping shaft 440 fails to press against the second clamping groove 1122 in time, the second flanged edge 133 is capable of pressing against the side of the serrated cutter 110 without the serrated blade 111 to avoid an opening angle of the serrated cutter 110 is too large. When the second flanged edge 133 presses against the side of the serrated cutter 110 without the serrated blade 111, the clamping shaft 440 is capable of pressing against the second clamping groove 1122 to lock the serrated cutter 110.

Figure 7:
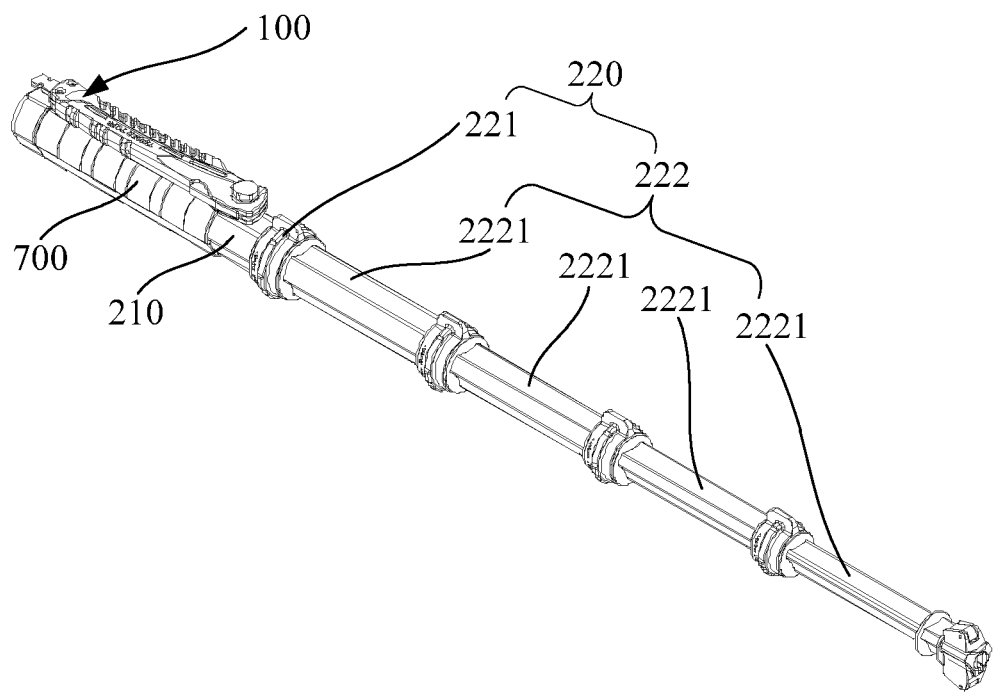
FIG. 7 schematically depicts a structure of a telescopic assembly in an extended state according to an embodiment of the present disclosure.

As shown in FIGS. 1 and 7, the support assembly 200 includes a support rod 210 and a telescoping assembly 220. The support rod 210 is connected to the telescoping assembly 220. The sheath 120 is detachably arranged on the telescoping assembly 220. The telescoping assembly 220 is configured to extend and retract along an axial direction of the telescoping assembly 220 to enable a setting position of the sheath 120 to be adjustable along the axial direction of the telescoping assembly 220. Specifically, the pole saw can prune trees of different heights conveniently by the telescoping assembly 220. In this embodiment, the first locking structure 300 is arranged at an end of the telescoping assembly 220 which is away from the support rod 210.

As shown in FIG. 7, the telescoping assembly 220 includes a fastening part 221 and a telescopic rod 222. The fastening part 221 is arranged on the telescopic rod 222. One end of the telescoping assembly 220 is connected to the support rod 210, and the other end of the telescoping assembly 220 is detachably connected to the sheath 120. The telescopic rod 222 is configured to extend an retract along an axial direction of the telescopic rod 222 to enable the setting position of the sheath 120 to be adjustable along the axial direction of the telescopic rod 222. The fastening part 222 is configured to lock the telescopic rod 222 at a preset length. Specifically, when the sheath 120 needs to be adjusted to a position, the fastening part 221 releases the telescopic rod 222, and the telescopic rod 222 extends or retracts along the axial direction of the telescopic rod 222 to adjust setting position of the sheath 120 to the position. Then the fastening part 221 locks the telescopic rod 222. In this embodiment, the telescopic rod 222 is connected to the sheath 120 through the first locking structure 300.

As shown in FIG. 7, the telescoping assembly 220 includes a plurality of rods 2221. The plurality of rods 2221 sleevedly connected successively. One of the plurality of rods 2221 closest to the support rod 210 is connected to the support rod 210. One of the plurality of rods 2221 farthest from the support rod 210 is detachably connected to the sheath 120. One of two adjacent rods 2221 is capable of moving along an axial direction thereof with respect to the other of the two adjacent rods 2221 to enable the telescopic rod 222 to extend or retract along the axial direction of the telescopic rod 222. The fastening part 221 is arranged at a connection between two adjacent rods 2221, and is configured to enable locking between the two adjacent rods 2221, such that the telescopic rod 222 is locked at the preset length. In this embodiment, the plurality of rods 2221 2221 are connected to the sheath 120 through the first locking structure 300

Figure 8:
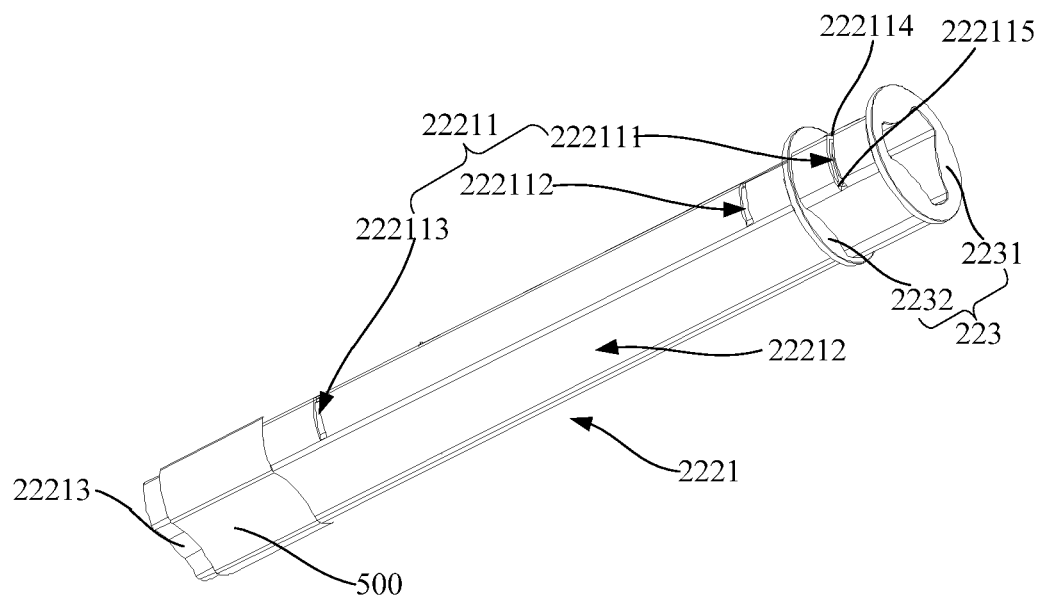
FIG. 8 schematically depicts a structure of a rod according to an embodiment of the present disclosure.
Figure 9:
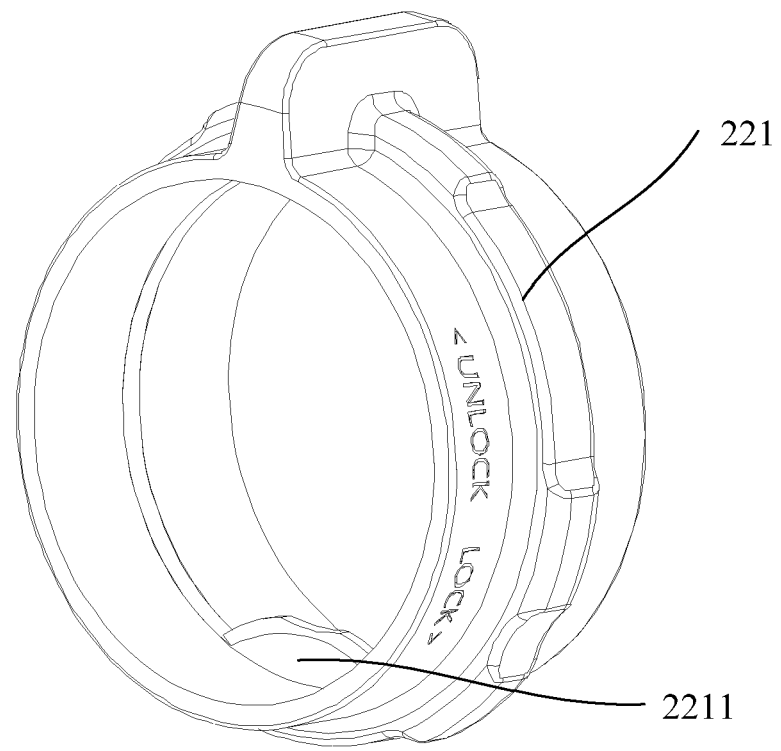
FIG. 9 schematically depicts a structure of a fastening part according to an embodiment of the present disclosure.

As shown in FIGS. 8 and 9, the fastening part 221 is sleevedly provided outside one of the plurality of rods 2221. A side of the fastening part 221 facing the rods 2221 is provided with a fastening piece 2211. A side wall of the rods 2221 is provided with a locking hole 22211. The locking hole 22211 is provided with a head end 222114 and a tail end 222115 opposite to each other. A depth of the head end 222114 is greater than a length of the locking piece 2211. A depth of the tail end 222115 is less than the length of the locking piece 2211. One of two adjacent rods 2221 is capable of moving along an axial direction thereof with respect to the other of the two adjacent rods 2221, such that the locking hole 22211 of the two adjacent rods 2221 are aligned or staggered. The fastening part 221 is capable of rotating with respect to the plurality of rods 2221 connected to the fastening part to enable the locking piece 2211 to move into or out of the locking hole 22211 through the head end 222114, such that the locking piece 2211 is clamped by the locking hole 22211 or separated from the locking hole 22211 to enable locking or unlocking between two adjacent rods of the plurality of rods 2221. The tail end 222115 is configured to resist the locking piece 2211 to limit a rotation of the locking piece 2211 in a direction close to the tail end 222115 of the locking hole 22211. Specifically, when the locking holes 22211 of the two adjacent rods 2221 are aligned, the fastening part 221 is capable of rotating with respect to the plurality of rods 2221 connected to the fastening part to enable the locking piece 2211 to move into of the locking hole 22211 through the head end 222114, such that the locking piece 2211 is clamped by the locking hole 22211 to enable locking between two adjacent rods of the plurality of rods 2221. When the sheath 120 needs to be adjusted to a position, the fastening part 221 is capable of rotating reversely with respect to the plurality of rods 2221 connected to the fastening part to enable the locking piece 2211 to move out of the locking hole 22211 through the head end 222114, such that the locking piece 2211 is separated from the locking hole 22211 to enable two adjacent rods of the plurality of rods 2221 to be released, and the sheath 120 can be adjusted to the position by adjusting the rods 2221. In this embodiment, the length of the locking piece 2211 is a length of the locking piece 2211 in a radial direction of the rods 2221.

As shown in FIG. 8, the locking hole 22211 includes a first locking hole 222111, a second locking hole 222112 and a third locking hole 222113 arranged spaced apart. One of the two adjacent rods 2221 is capable of moving along the axial direction thereof with respect to the other of the two adjacent rods 2221 to enable the second locking hole 222112 or the third locking hole 222113 of the one of the two adjacent rods 2221 to be aligned with the first locking hole 222111 of the other of the two adjacent rods 2221. Specifically, when the third locking hole 222113 of the one of the two adjacent rods 2221 is aligned with the first locking hole 222111 of the other of the two adjacent rods 2221, a length of the one of the two adjacent rods 2221 sleeved on the other of the two adjacent rods 2221 is the shortest, that is, the one of the two adjacent rods 2221 is in an extended state with respect to the other of the two adjacent rods 2221. When the second locking hole 222112 of the one of the two adjacent rods 2221 is aligned with the first locking hole 222111 of the other of the two adjacent rods 2221, a length of the one of the two adjacent rods 2221 sleeved on the other of the two adjacent rods 2221 is the largest, that is, the one of the two adjacent rods 2221 is in a retracted state with respect to the other of the two adjacent rods 2221. In this embodiment, the first locking hole 222111, the second locking hole 222112 and the third locking hole 222113 all are provided with the head end 222114 and the tail end 222115 opposite to each other.

As shown in FIG. 8, the rods 2221 are each provided with a recess 22212 along the axial direction. A depth of the recess 22212 is greater than the length of the locking piece 2211. A depth of a part of the rods 2221 without the recess 22212 is less than the length of the locking piece 2211, such that the part of the rods 2221 without the recess 22212 is capable of limiting a rotation of the locking piece 2211.

As shown in FIG. 8, each of the rods 2221 is provided spaced apart with three recesses 22212, which makes a cross section of the rod 2221 approximately triangular, enhancing the stability and reliability of the rods 2221.

In an embodiment, the rods 2221 are made of a metal material.

As shown in FIG. 8, the telescopic assembly 220 further includes a connecting sleeve assembly 223. The fastening part 221 is arranged on the connecting sleeve assembly 223. Two adjacent rods 2221 are connected sleevedly through the connecting sleeve assembly 223. One of the two adjacent rods 2221 is movably sleeved inside the connecting sleeve assembly 223, and the other of the two adjacent rods 2221 is fixedly sleeved on an outer periphery of the connecting sleeve assembly 223. The rod 2221 movably sleeved inside the connecting sleeve assembly 223 is capable of moving along its axial direction with respect to the connecting sleeve assembly 223 to realize the movement of the one of the two adjacent rods 2221 with respect to the other of the two adjacent rods 2221.

In an embodiment, the connecting sleeve assembly 223 is made of a plastic material, which contributes to the high processing precision of the connecting sleeve assembly 223, such that the connecting sleeve assembly 223 can be reliably matched with the rods 2221.

As shown in FIG. 8, the connecting sleeve assembly 223 includes a first connecting sleeve 2231 and a second connecting sleeve 2232. One of the two adjacent rods 2221 is movably sleeved inside the first connecting sleeve 2231, and the other of the two adjacent rods 2221 is fixedly sleeved on the outer periphery of the first connecting sleeve 2231. The second connecting sleeve 2232 is fixedly sleeved on the outer periphery of the other of the two adjacent rods 2221. The fastening part 221 is arranged on the outer periphery of the second connecting sleeve 2232.

As shown in FIG. 8, an outer side wall of each of the rods 2221 is provided with an anti-off part 500, which is configured to press against the connecting sleeve assembly 223, such that the rods 2221 are prevented from falling off the connecting sleeve assembly 223 when moving relative to the connecting sleeve assembly 223 along its axial direction. In this embodiment, the anti-off part 500 is configured to press against the first connecting sleeve 2231.

As shown in FIG. 8, the rods 2221 are each provided with a third protrusion 22213, which is configured to press against the anti-off part 500 to prevent the anti-off part 500 from falling off the rods 2221.

Figure 10:
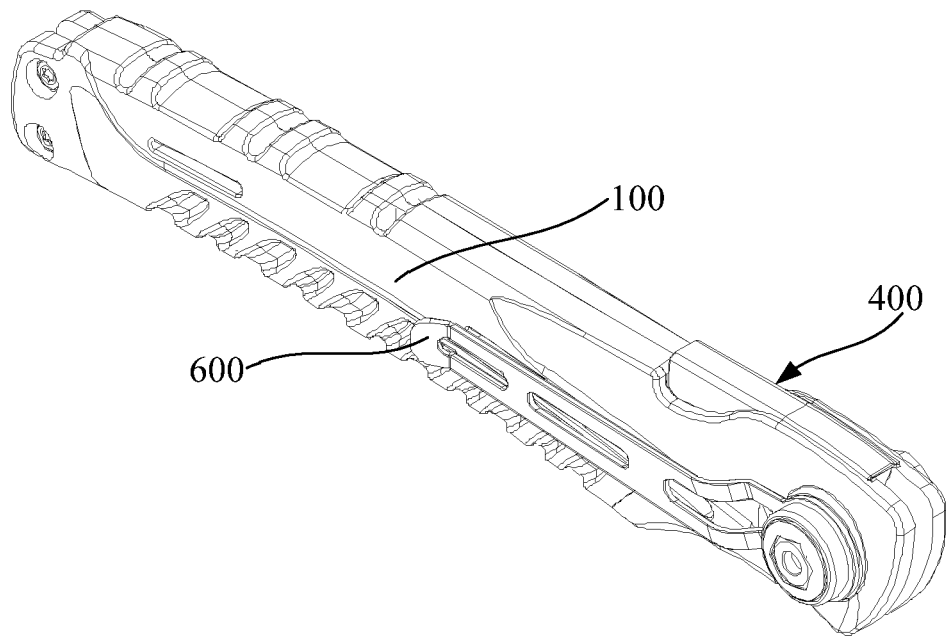
FIG. 10 schematically depicts a structure of the cutting assembly according to an embodiment of the present disclosure.

As shown in FIGS. 1 and 10, the sheath 120 is provided with a hanging part 600 which is configured to allow the sheath 120 to be hung on the support assembly 200. In this embodiment, the hanging part 600 is configured to allow the sheath 120 to be hung on the support rod 210.

Figure 2:
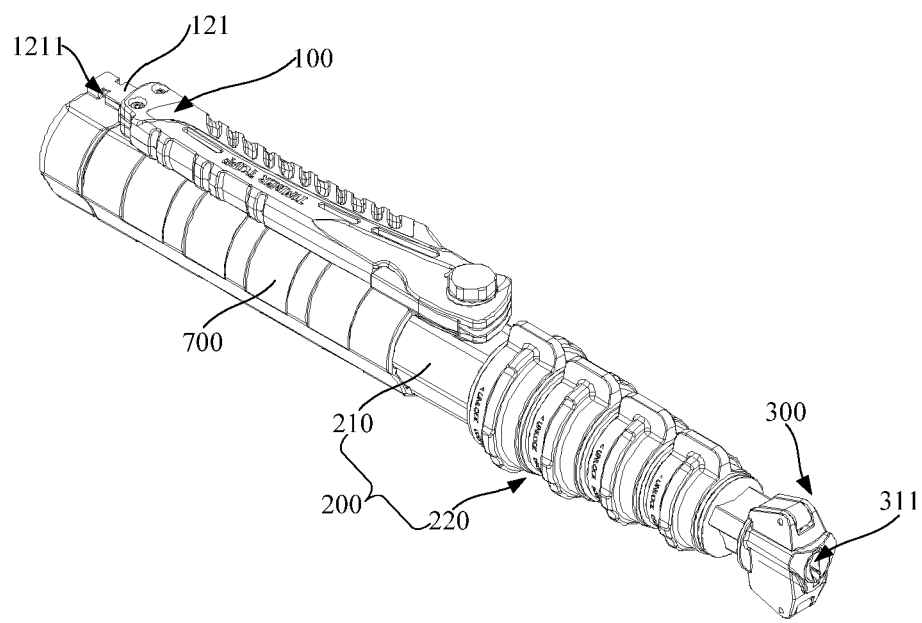
FIG. 2 schematically depicts a structure of a support assembly and a first locking structure according to an embodiment of the present disclosure.

As shown in FIG. 2, the support assembly 200 is provided with a hanging sleeve 700. The hanging part 600 can be hung on the hanging sleeve 700 to hang the sheath 120 on the support assembly 200. Specifically, the hanging part 600 can be hung on the hanging sleeve 700 to facilitate the carrying of the cutting assembly 100 when the pole saw is not in use. In this embodiment, the hanging sleeve 700 is arranged on the support rod 210.

In an embodiment, the hanging sleeve 700 is sleeved on the support rod 210. Specifically, the hanging sleeve 700 is made of rubber.

Figure 11:
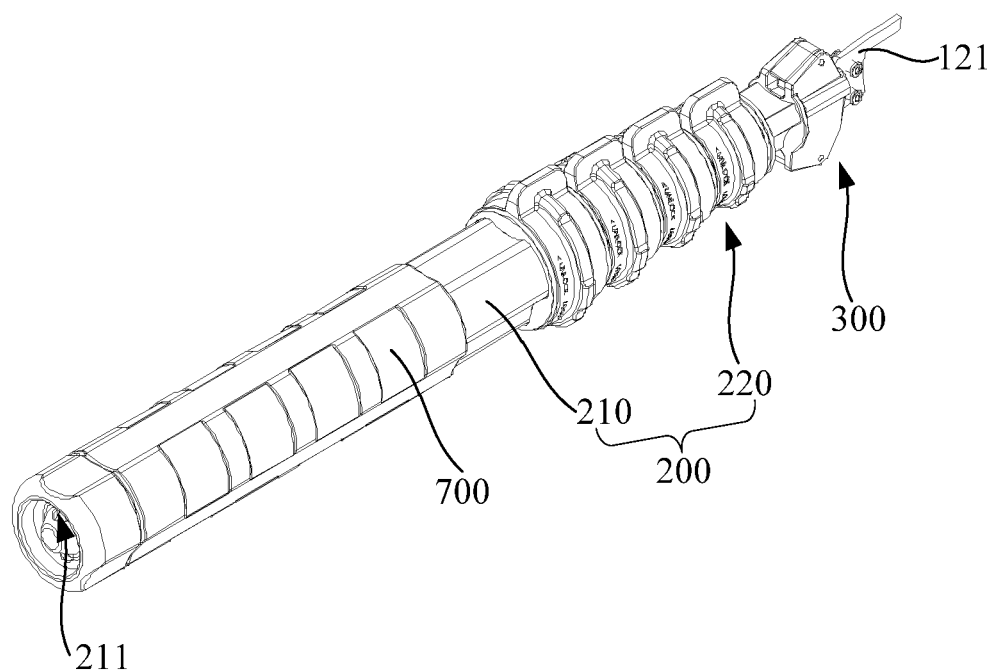
FIG. 11 schematically depicts a structure of the telescopic assembly in a retracted state according to an embodiment of the present disclosure.

As shown in FIG. 11, an end of the support assembly 200 away from the cutting assembly 100 is provided with a hanging hole 211. The hanging hole 211 is configured to hang a rope. Specifically, when the pole saw is in use, the support assembly 200 is held by a hand of the user, and the rope is sleeved on an arm of the user, such that the pole saw is prevented from falling off the user's hand. In this embodiment, the hanging hole 211 is located at an end of the support rod 120 away from the telescopic assembly 220.

As shown in FIG. 11, the hanging hole 211 does not extend out of an end surface of the support assembly 200, such that the hanging hole 211 is prevented from being damaged. Specifically, the hanging hole 211 is embedded.

Mentioned above are merely preferred embodiments of this disclosure, and are not intended to limit the scope of the present disclosure. It should be understood that changes, modifications and replacements made by those killed in the art without departing from the spirit of this disclosure should fall within the scope of the present disclosure defined by the appended claims.

What is claimed is:

1. A pole saw, comprising:

a cutting assembly; and a support assembly;

wherein the cutting assembly comprises a serrated cutter and a sheath; the serrated cutter is rotatably connected to the sheath; the sheath is provided with a first groove for accommodating the serrated cutter; the serrated cutter is configured to rotate with respect to the sheath to move into or out of the first groove so as to make the serrated cutter sheathed or exposed; and the sheath is detachably arranged on the support assembly;

the cutting assembly further comprises a first locking structure; the first locking structure comprises a rotating shaft, a first locking part, a first elastic part, and a clamping shaft the rotating shaft is arranged on the sheath, and the first locking part is rotatably arranged on the rotating shaft the first locking part is provided with a pressing end and a butting end; the first elastic part is connected between the sheath and the pressing end; the clamping shaft is connected to the butting end; the serrated cutter is provided with a first clamping groove and a second clamping groove arranged oppositely; as the first locking part rotates by pressing the pressing end, when the first clamping groove is clamped with the clamping shaft, the serrated cutter is locked in a folding state, and when the second clamping groove is clamped with the clamping shaft, the serrated cutter is locked in an opening state; and the cutting assembly further comprises a first baffle and a second baffle which are oppositely arranged in the first groove; the first baffle is further provided with a first flanged edge and a second flanged edge separated from each other; and the first elastic part is in face contact with the first flanged edge to prevent the first elastic part from being caught between the first flanged edge and the second baffle.

2. The pole saw of claim 1, further comprising:

a second locking structure;

wherein the second locking structure is arranged on the support assembly; and the second locking structure is configured to lock the sheath with respect to the support assembly.

3. The pole saw of claim 2, wherein the second locking structure comprises a bearing part and a second locking part; the bearing part is arranged on the support assembly; the bearing part is provided with a second groove; the sheath is provided with a clamping portion; the second groove is configured to accommodate the clamping portion; a side wall of the clamping portion is provided with a third groove; the second locking part passes through the bearing part, and partially extends into the second groove; and the second locking part is configured to move close to or away from the clamping portion with respect to the bearing part so as to be clamped by the third groove or separated from the third groove, such that the sheath is locked by the second locking part or released.

4. The pole saw of claim 3, wherein the second locking structure further comprises an adjustment part and a second elastic part; the adjustment part is rotatably arranged on the bearing part; the adjustment part is configured to abut against an end of the second locking part extending out of the second groove to drive the adjustment part to rotate with respect to the bearing part, such that the second locking part is pushed to move close to the clamping portion with respect to the bearing part to be clamped with the third groove; the second elastic part is sleeved outside the second locking part, and abuts elastically against the end of the second locking part extending out of the second groove; and the second elastic part is configured to provide an elastic force to drive the second locking part to move away from the clamping portion with respect to the bearing part, such that the second locking part is separated from the third groove.

5. The pole saw of claim 1, wherein the support assembly comprises a support rod and a telescopic assembly; the support rod is connected to the telescopic assembly; the sheath is detachably arranged on the telescopic assembly; and the telescopic assembly is configured to extend and retract along an axial direction of the telescopic assembly to enable a setting position of the sheath to be adjustable along the axial direction of the telescopic assembly.

6. The pole saw of claim 5, wherein the telescopic assembly comprises a fastening part and a telescopic rod; the fastening part is arranged on the telescopic rod; one end of the telescopic rod is connected to the support rod, and the other end of the telescopic rod is detachably connected to the sheath; the telescopic rod is configured to extend and retract along an axial direction of the telescopic rod to enable the setting position of the sheath to be adjustable along the axial direction of the telescopic rod; and the fastening part is configured to lock the telescopic rod at a preset length.

7. The pole saw of claim 6, wherein the telescopic rod comprises a plurality of rods; the plurality of rods are sleevedly connected successively; one of the plurality of rods closest to the support rod is connected to the support rod; one of the plurality of rods farthest from the support rod is detachably connected to the sheath; one of two adjacent rods is capable of moving along an axial direction thereof with respect to the other of the two adjacent rods to enable the telescopic rod to extend or retract along the axial direction of the telescopic rod; and the fastening part is arranged at a connection between two adjacent rods, and is configured to enable locking between the two adjacent rods, such that the telescopic rod is locked at the preset length.

8. The pole saw of claim 7, wherein the fastening part is sleevedly provided outside one of the plurality of rods; the fastening part is provided with a locking piece; a side wall of each of the plurality of rods is provided with a locking hole; the locking hole is provided with a head end and a tail end opposite to each other; a depth of the head end is greater than a length of the locking piece; a depth of the tail end is less than the length of the locking piece; one of two adjacent rods is capable of moving along an axial direction thereof with respect to the other of the two adjacent rods, such that locking holes of the two adjacent rods are aligned or staggered; the fastening part is capable of rotating with respect to one of the plurality of rods connected to the fastening part to enable the locking piece to move into or out of the locking hole through the head end, such that the locking piece is clamped by the locking hole or separated from the locking hole to enable locking or unlocking between two adjacent rods of the plurality of rods; and the tail end is configured to resist the locking piece to limit a rotation of the locking piece in a direction close to the tail end of the locking hole.

* * * * *